(No Model.)

C. W. SALADEE.
Phaeton.

No. 236,959.                Patented Jan. 25, 1881.

Attest:
Courtney A. Cooper
A. Hansmann.

Cyrus W. Saladee
By his attorney
Charles E. Foster

UNITED STATES PATENT OFFICE.

CYRUS W. SALADEE, OF WOLCOTTVILLE, CONNECTICUT.

PHAETON.

SPECIFICATION forming part of Letters Patent No. 236,959, dated January 25, 1881.

Application filed October 7, 1880. (No model.)

*To all whom it may concern:*

Be it known that I, CYRUS W. SALADEE, of Wolcottville, Litchfield county, State of Connecticut, have invented certain Improvements in Hanging Phaeton-Bodies, of which the following is a specification.

My invention is an improvement in hanging phaeton-bodies, fully described hereinafter, whereby I secure a more effective and easy-riding spring-support and a greatly improved appearance.

Figure 1:
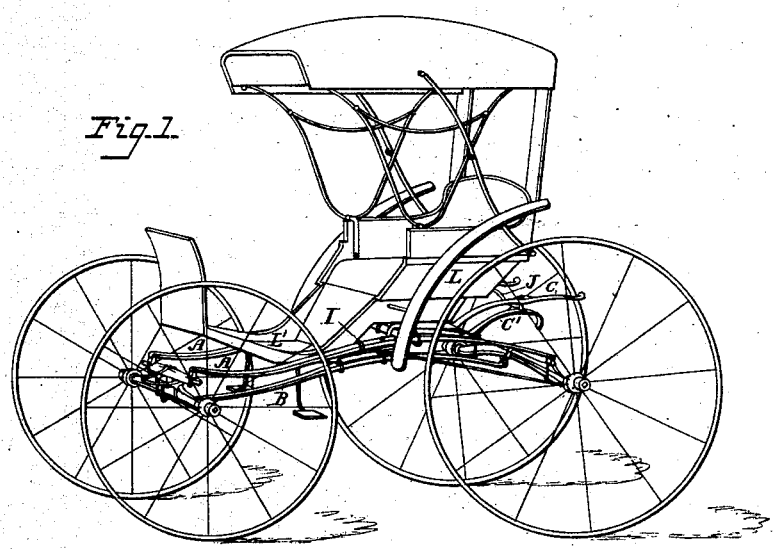
Figure 2:
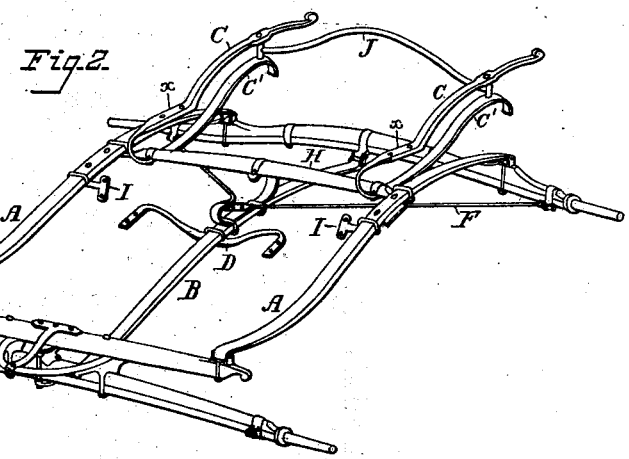
Figure 3:
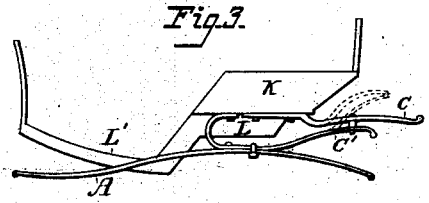
Figure 4:
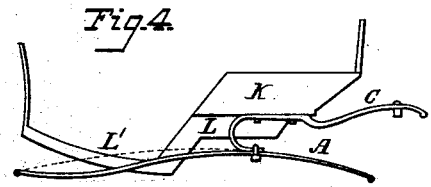

In the drawings, Figure 1 is a perspective view, showing a phaeton with my improvements. Fig. 2 is a perspective view of the gear; Figs. 3 and 4, side views illustrating modifications.

Owing to the fact that the body of a phaeton is lower at the front than at the back the use of side springs for the platforms has been considered objectionable. Although such bodies have been hung by means of cross-bars and stays upon springs at the sides, the said springs have either proved an obstruction to entering and leaving the vehicle, being higher than the drop-front L', as shown in dotted lines, Fig. 4, or it has been necessary to raise the body to a height above the axles that is both inconvenient and unsightly.

By my improvement I avoid all obstructions, hang the body as low as may be desirable, and secure all the advantages due to the use of semi-elliptic side springs in the spring-platform.

The platform may consist of two semi-elliptic side springs, A A, connected to the bolster and rear axle in any suitable manner; and, if desired, a semi-elliptic spring-perch, B, may also be used, in which case it is braced to the body by suitable stays D, connected to the main portion L, or drop-front L' of the body. Suitable diagonal stays F may also be used.

Between the springs A A, I hang the body by means of suitably-constructed brackets C, connected directly or indirectly to the springs and to the main portion of the body, and preferably arranged longitudinally, as shown. The shape of such brackets is not material, but they must serve to permit the body to drop down between the springs and afford a bearing for the same adjacent to the seat, near each side.

In Figs. 1 and 2 the brackets are connected to a cross-bar, H, attached to the side springs, and the main portion L of the body is bolted to the bearings $x$ of the brackets, the rear ends of which are extended and connected by a cross-rod, J.

At each side the drop-front L' of the body is connected by brackets I to the side springs, the body attachments being thus sufficiently separated to afford a wide bearing, but not of such extent as to interfere with the freedom of flexion of the side springs.

If desired, the brackets C may be spring-brackets (see dotted lines, Fig. 3) allowing a slight independent motion of the body, in which case there should be links or flexible front connections in place of the rigid brackets I.

In connection with the brackets C, I may use supplemental brackets or braces C', which serve to brace the rear ends of the brackets C, or may be part thereof, forming continuous metal loops, Figs. 1 and 2, of great strength, but comparatively light in weight, one portion bracing the other.

A most desirable construction is shown in Figs. 3 and 4, where the seat K is of standard width, and the body is reduced or narrowed, so that the springs A may be brought directly beneath the ends of the seat, thus permitting the body to hang "low down," affording a substantial and steady bearing, facilitating the turning of the vehicle, and greatly improving the appearance of the whole structure. While this mode of hanging may be employed with springs of different construction, I have shown it, in connection with side springs, bent downward at the front ends, to drop to or below the level of the drop-front, with a curve the reverse of that of the opposite end, thereby avoiding obstructing the entrance to the vehicle without interfering with the spring-action and greatly improving the appearance, as the curve of the spring approximates the outline of the lower part of the body.

I claim—

1. The combination, in a phaeton, of a drop-front body, semi-elliptic side springs, between which the body is suspended, and brackets connected each to one of said side springs and to the higher portion of the body above said spring, substantially as set forth.

2. The combination of the body, semi-elliptic side springs, between which the body is suspended, and brackets arranged longitudinally, and connected each to one of the springs and to the body, substantially as set forth.

3. The combination of the body of a phaeton having an overhanging seat, of side springs extending upon opposite sides of the drop-front and beneath, and connected by brackets to said seat, substantially as set forth.

4. The combination of the body L L' of a phaeton, side springs, A A, arranged opposite the sides of the body, and spring-brackets connected to said side springs and supporting the body thereon, substantially as set forth.

5. The combination, with the drop-front body of a phaeton, of springs arranged opposite the sides of the body and curved downward at the front, with a reverse curve at the rear to approximate the outline of the bottom of the body, substantially as set forth.

6. The combination, with the drop-front body of a phaeton, of springs arranged opposite the sides of said body, curved downward at the front to conform to the level of the drop-front of the body, substantially as set forth.

In testimony whereof I have signed my name to this specification in the presence of two subscribing witnesses.

CYRUS WELLINGTON SALADEE.

Witnesses:
CHARLES E. FOSTER,
WILLIAM PARTON.